Patented Feb. 6, 1951

2,540,601

UNITED STATES PATENT OFFICE 2,540,601

METHOD OF MOLDING HIGH WET GEL STRENGTH DIOLEFIN COPOLYMERS

Miller W. Swaney, Cranford, and Erving Arundale, Westfield, N. J., assignors to Standard Oil Development Company, a corporation of Delaware No Drawing. Application September 30, 1944, Serial No. 556,660

1 Claim. (Cl. 260—83.3)

The present invention pertains to the production of improved types of synthetic rubber latices possessing properties which will permit their use in various applications formerly filled only by natural rubber latex.

A synthetic rubber latex satisfactory for use in conventional natural rubber latex operations should possess the following properties:

(1) High solids content or be capable of concentration to high solids content by creaming, centrifuging, evaporation, etc.
(2) Low soap and ash content.
(3) Stable to mechanical agitation and to compounding ingredients.
(4) Satisfactory tensile strength, elongation, and tear resistance of the dry rubber.
(5) Good wet film strength or wet gel strength.

Natural rubber latex possesses most of these desirable properties but the synthetic rubber latices of the buna type are in general characterized by (a) Low solids content.
(b) High soap and ash values.
(c) Poor wet gel strength.
(d) Low tensile strength and elongation of the pure gum compound.

A buna type latex which fulfills properties 1, 2, 3 above can be prepared either by direct synthesis in which the emulsion polymerization is carried out in the presence of reduced quantities of water and emulsifier or by creaming or centrifuging a dilute latex since these properties are for the most part dependent on the emulsion system. However, it is common knowledge that buna type emulsion polymers prepared with butadiene as one of the coreactants have very poor wet film strength or wet gel strength and low tensile strength, etc. when compounded in the pure gum condition, for these properties are a function of the polymer molecule and not of the emulsion itself. Wet film strength or wet gel strength refers to the strength of the wet rubber-like material obtained from a latex through the addition of coagulants such as acids, brine, polyvalent salts, alcohols, ketones, etc. or of gelation agents such as sodium silico fluoride, calcium fluoride, boric acid, ammonium nitrate, 2-methyl 2-nitro 1-propanol, etc. Good wet film strength is a very important requisite for all latex operations as mentioned above but particularly so in the case of the manufacture of foam sponge, dipped goods, molded goods, latex thread, etc. Foam sponge prepared from a latex possessing poor gel strength will collapse before being dried and cured and will therefore lose its porosity and sponge-like properties. Dipped goods, particularly gloves, prepared from the same latex, will develop cracks between the fingers as a result of the stresses existing between the fingers of the mold and also the poor wet film strength which is not sufficient to maintain a continuous film at these points. Molding operations cannot be carried out satisfactorily on such latices because of the cheese-like nature of the buna latex gels. Buna gels also shrink (synerese) very rapidly and extensively after gelation, a condition which is undesirable in the manufacture of molded articles through gelation. Extensive shrinkage causes the article to pull away from the mold thereby losing its shape and size. Natural rubber latex gels have excellent wet film strength or wet gel strength and low shrinkage values and, for this reason, numerous speciality articles have been made in the past from this latex.

There has been built up around natural rubber latex a vast industry producing such articles as rubber gloves, bathing caps, balloons, surgical goods, and countless other articles which are made by dipping porcelain or metal forms into natural rubber latex and subsequently coagulating or drying the thin film of latex which adheres to the form. This film is then usually stripped off the molds and vulcanized at elevated temperatures. This can be done with natural rubber latex because of the fact that in this membranous form, the unvulcanized rubber possesses a high degree of wet film strength. Snythetic rubber latices such as butadiene-styrene copolymers (Buna S) or butadiene-acrylonitrile copolymers (Buna N) differ radically from natural rubber latex as has been mentioned before particularly in the fact that they possess little or no wet gel strength. For example, when Buna S or Buna N latex is coagulated or gelled the coagulate or gel produced possesses practically no strength at all and will crumble or fall apart in the hands. Since latex equipment was built to handle latices of the heretofore mentioned properties it is, for the most part, lying idle because of the absence of natural rubber latex imports and the fact that practically all the synthetic rubber latices yield coagulates or gels which lack the cohesiveness or wet gel strength necessary for handling on existing latex equipment.

It is the object of the present invention therefore to prepare synthetic rubber latices by the copolymerization of conjugated diolefin hydrocarbons with compounds containing a single CH₂=C< group in aqueous emulsion for use in latex operations.

It is a further object of this invention to prepare latices by the copolymerization of conjugated diolefin hydrocarbons with mono-olefinic compounds which are capable of yielding coagulates or gels of good wet gel strength and high tensile strength when compounded in pure gum form.

These and other objects will appear more clearly from the detailed description and claims which follow:

We have found that buna type rubbers, i. e., emulsion copolymerizates of mixture of conjugated diolefin hydrocarbons such as butadiene, isoprene, piperylene, dimethyl-butadiene, 2-methyl pentadiene, 2-ethyl hexadiene 1,3 and the like or copolymerizates of such diolefins with copolymerizable materials containing a single CH₂=C< group such as styrene, alpha methyl styrene, para methyl styrene, alpha methyl para methyl styrene, chloro styrenes, acrylonitrile, methacrylonitrile, chloroacrylonitrile, acrylic acid esters, methacrylic acid esters and unsaturated ketones such as methyl vinyl ketone possessing pure gum tensile strength and wet gel strength which are useful in latex operations can be prepared by modifying the reactants and/or conditions employed in the emulsion polymerization reaction as follows:

(a) By copolymerizing dienes with styrene, alpha - methyl - styrene, alpha-methyl para-methyl styrene, chloro styrene, acrylonitrile, methacrylonitrile, chloroacrylonitrile, chloromethacrylonitrile, methyl isopropenyl ketone, ethyl fumarate, acrylic or methacrylic esters and the like at temperatures between about 10 and 25° C.

This procedure necessitates a considerable extension of the reaction period, i. e., to about 150–200 hours to reach 60–70% conversion.

(b) By using an unmodified polymerization technique which employs hydrogen peroxide catalyst in the absence of polymerization modifiers or chain shorteners such as mercaptans. This also has the effect of slowing down the reaction in some cases but is conducive to the formation of long polymer molecules since the mercaptan modifiers have the effect of stopping chain growth.

(c) By increasing the ratio of styrene, acrylonitrile, or other coreactants to diolefin in the reaction mixture.

This has a tendency to render the polymer more resinous in nature. Polymers containing 20–55% of coreactant are contemplated.

(d) By substituting isoprene, piperylene, 2-3 dimethylbutadiene, 2-methyl pentadiene 1,3, 2-ethyl hexadiene-1,3, etc. for butadiene as the copolymerizing diolefin with acrylonitrile.

(e) By preparing three component polymers from mixtures of butadiene and isoprene with acrylonitrile, styrene, or other vinyl type coreactant.

The latter two expedients, i. e., the use of isoprene in copolymers with acrylonitrile or in tripolymers with butadiene and a copolymerizable vinyl compound such as styrene, alpha-methyl-styrene, acrylonitrile, chloro styrene, methacrylonitrile and the like appear to be desirable due to the potential availability of isoprene and also to the fact that little change in the polymerization procedures would be necessary. The use of low temperatures and conducting the polymerization in the absence of modifiers are highly effective but necessitate the use of extremely long reaction periods. The above conditions tend to foster a formation of polymers with longer polymer chains, i. e., higher molecular weight materials, a more uniform molecular distribution, and the absence of undesirable low molecular weight constituents.

The polymerization may be carried out by dispersing one part of reactants in from about one and one-half to two parts of water using an emulsifying agent yielding a neutral to alkaline reaction mixture such as soaps and alkali salts of alkylated naphthalene sulfonic acids and high molecular weight alkyl sulfates or sulfonates and the like. A polymerization catalyst such as hydrogen peroxide, benzoyl peroxide or sodium, potassium or ammonium persulfates or perborates is added to the reaction mixture in amounts of between about 0.05 and 0.6 weight percent based upon the monomers present. When using perborates or persulfates as the polymerization catalyst, small amounts, i. e., up to about 0.5 weight percent based on reactants of mercaptan type polymerization modifiers may be added to the reaction mixture. The mercaptan type modifiers are in general those which contain at least about seven carbon atoms in an aliphatic linkage such as heptyl, octyl, dodecyl, "Lorol," diisobutyl and benzyl mercaptans.

In order to obtain low soap and ash values the latices should be prepared in the presence of low soap concentrations, i. e., less than about 2% based on the water. Potassium oleate latices are best for latex operations involving compounding since they are much more stable to compounding dispersions. Latices having low soap and ash values can also be prepared in the presence of sodium tetraisobutenyl sulfonate and sodium lauryl sulfate since such emulsifiers are used in smaller amounts than the ordinary soaps.

When the desired conversion of monomers is obtained, the latex is stabilized with a suitable antioxidant such as phenyl-beta-naphthylamine, ditertiary butyl cresol, hydroquinone hydroxyl amine hydrochloride or sulfate and the like, and then stripped of unreacted monomers. The latices removed from the stripping operation are of little value for latex uses because their solids content is only of the order of about 20–25%. It has been found, however, that such synthetic latices may be concentrated to 50–55% rubber solids content by creaming.

Creaming of the latices to the desired solids content can be effected in several ways as described in application Serial No. 502,789, filed September 17, 1943, by E. Arundale, now abandoned. One of these processes, which may be termed a "low temperature" destabilization process, involves mixing the dilute latex with a 4% ammonium chloride solution (11 parts dry NH₄Cl/100 parts latex solids) at 35° C. After a ¾ hour contact period the destabilized latex is quenched (NH₄Cl destroyed) through the addition of a 60% potassium hydroxide solution and the ammonium alginate creaming agent is then added to bring about a separation between cream and serum. Cream solids of 55–56% can be obtained by this process. The serum contains 0.35–0.4% rubber indicating a 97.5–98% rubber recovery. Because of the high solids content, such creams are satisfactory for latex operations, particularly foam sponge manufacture, where water resistance is no criterion. However, due to the fact that the destabilized latex must be quenched with a fixed alkali to avoid gelation by the ammonium chloride during the gravitation step, the ash contents and, therefore, the water absorption of such creams are high. This limits the use of these creams, for example, in fuel cell manufacture.

In order to overcome this high water absorption and thereby obtain a latex which could be used in the preparation of fuel cells, the second or "high temperature" creaming process was devised. In this case the destabilization or particle size increase is carried out at 60° C. using a 5% ammonium chloride solution (4 parts dry NH₄Cl/100 parts latex solids) as the destabilizer. Since smaller amounts of ammonium chloride are used, the mixture can be quenched with ammonium instead of potassium hydroxide. Ammonium alginate is again used to produce creaming. Creams containing 50-52% solids and serums containing 0.45-0.5% rubber can be obtained by this process. The overall rubber recovery is above 98%. This process has several advantages over the low temperature process described above. Since small quantities of reagents are employed, (a) There is a saving in chemical costs,
(b) The capacity of the creaming unit is increased,
(c) The dilution effect is less thereby fostering better rubber recovery,
(d) Smaller quantities of the water solubles which lower the water absorption of spread sheets prepared from such creams are present in creams prepared in this way.

Such creams can be gelled easily using dispersions of the well known latex gelation agents particularly sodium silico fluoride which is best prepared by ball milling the silico fluoride with an equal weight of water and 2% bentonite (based on Na₂SiF₆). Increasing the amount of gelation agent or the gelation temperature decreases the gel time. The gel rate can be increased also by lowering the pH of the latex with certain buffers or with carbon dioxide prior to the addition of the gelation agent. Local coagulation of the latex can be prevented by raising the pH of the silico fluoride dispersion with ammonia or with a fixed alkali prior to the addition to the latex cream.

For the purpose of comparing the wet gel properties of high solids synthetic latices the following test procedure was employed.

The apparatus called a "bursting die" consists of a small cylindrical chamber 6" x 2" inside diameter closed at one end and carrying a central ½" diameter hole in the other. A 1¾" diameter sample of the wet gel is clamped over the hole by means of a flange which carries a 1" diameter central orifice. The flange is attached to the main cylinder by four flat head screws. Two inlet pipes to the chamber serve respectively as leads for applying air pressure and for measuring the pressure by means of a single mercury manometer. A central circle of the test disc 1" in diameter is therefore free to be inflated by the applied pressure. The air is admitted to the die slowly and evenly and, at a certain pressure, the 1" section is forced out of the orifice forming a balloon. The pressure, as recorded on the mercury manometer, necessary to make the sample yield and form a balloon is called the "yield pressure." The introduction of air is then continued and the balloon grows in size, the pressure drops and ultimately the balloon ruptures. The pressure at the time of rupture is somewhat lower than the yield pressure and is called the "bursting pressure." A board containing grids one centimeter apart is placed behind the balloon and the dimensions of the balloon at the moment of burst are recorded photographically. Assuming the bubble to be an oblate spheroid, the volume thereof can then be calculated as follows:

Volume (in cc.) =
$$4/3\pi \frac{(\text{major diameter in cm.})^2}{4} \frac{(\text{minor diameter in cm.})}{2}$$

The wet film strength can be calculated using the following simplified equation for a 1" orifice and a specimen 0.325 centimeter thick.

Wet film strength (lbs./sq. in.) =.343 (major diam. of bubble at burst in cm.)²(manometer pressure in cm. of Hg)

The test specimen is prepared by pouring the latex containing the gelation agent (50% Na₂SiF₆ dispersion) into a shallow glass tray 0.325 centimeter deep, covering the tray with a glass slide, and allowing the latex to gel. After standing in the mold 5 minutes after gelation the sample is removed, cut into several 1¾" diameter discs, and the wet gel determination then made thereon. In all tests the latices are gelled at a given solids content (50%) to a constant gel time (1¾ minutes). The latex is allowed to stand several hours before being gelled to permit air bubbles to escape and thereby prevent imperfections in the gels.

The following examples are illustrative of the present invention but it will be understood that our invention is not limited to the specific conditions disclosed.

EXAMPLE 1

A series of polymerization runs were made using a 2:1 ratio of water to reactants with 3.1% of oleic acid based on total reactants (oleic acid 90% neutralized with KOH) as the emulsifier, 0.5% of mercaptan derived from commercial lauryl alcohol and 0.3% of potassium persulfate catalyst. The percentages given are based upon total reactants.

In two of the runs (H-3-8 and 206-8) an unmodified polymerization technique was used. In these runs 5% of potassium oleate (oleic acid 67% neutralized) was used as the emulsifier and 0.6% of hydrogen peroxide (activated by the addition of 0.041% ferric sulfate and 0.0018% cobalt chloride) was used as the catalyst. The percentages given are based upon the reactants. In these two runs, no mercaptan type polymerization modifier was present in the reaction mixture.

In all of the runs, the polymerization was conducted at the temperatures and for the times indicated in the table set out below. The conversions obtained varied between about 70 and about 80%. At the conclusion of each run the reaction mixture was short-stopped by the addition of 0.1% of hydroquinone based upon the reactants and then 2% of phenyl beta naphthylamine based on the polymer was added as a stabilizer whereupon the latices were vacuum stripped and creamed to 50% solids. Except as noted above the only variables in the several runs were the reactants employed and the percentages thereof. Using the above test procedure, these buna type gels were evaluated for wet film strength. The data are presented in Table 1.

Table I

| Sample No. | Reactants [1] | Weight Ratio Reactants | Time | Temp., °C. | Bubble Size, cm. Width | Bubble Size, cm. Height | Yield Pressure, cm. Hg | Burst Pressure, cm. Hg | Bubble Volume, c. c. | Wet Film Strength, lb./sq. in. |
|---|---|---|---|---|---|---|---|---|---|---|
| 273-1 | But. A. N | 75/25 | 15¼ Hrs | 35 | | | 22.7 | Cheeselike | No Bubble | |
| 288-1 | do | 65/35 | 16 Hrs | 29 | | | 37.0 | | 8 small weak bubble | |
| H-3-8[2] | do | 74/26 | 11 Days | 10 | 17 | 14.5 | 45.0 | 1.0 | 2200 | 99.2 |
| H-3-7 | do | 75/25 | 19 Hrs | 50 | | | 7.7 | Cheeselike | No Bubble | |
| 206-8 [2] | do | 75/25 | 20 Days | 10-15 | 10 | 9 | 31.2 | 0.4 | 472 | 13.75 |
| 273-3 | Isop. A. N | 80/20 | 21 ½ Hrs | 35 | 9 | 9½ | 14.0 | 0.12 | 427 | 3.7 |
| 273-2 | do | 75/25 | 18½ Hrs | 35 | 11 | 10 | 17.9 | 0.12 | 635 | 5.0 |
| 278-2 | do | 70/30 | 15¼ Hrs | 35 | 25 | 23 | 32.8 | 2.2 High, 0.23 Low | 7550 | 49.4 |
| 286-1 | do | 65/35 | 17¼ Hrs | 29 | 23 | 17 | 40.5 | 6.1 High, 0.5 Low | 4720 | 91.0 |
| 288-4 | do | 60/40 | 15¼ Hrs | 29 | 26 | 18 | 39.5 | 8.5 High, 1.54 Low | 6390 | 356.0 |
| 278-1 | Isop. M. A. N | 70/30 | 24 Hrs | 35 | 12 | 11 | 25.2 | 0.10 | 830 | 4.9 |
| 273-4 | Isop. Sty. A. N | 65/10/25 | 18 Hrs | 35 | 19.5 | 19.5 | 21.6 | 0.8 High, 0.14 Low | 3890 | 18.2 |
| 286-3 | do | 60/10/30 | 18½ Hrs | 29 | 23 | 16 | 38.5 | 5.8 High, 0.4 Low | 4450 | 72.7 |
| 288-2 | do | 50/20/30 | 17¾ Hrs | 29 | 23 | 16.5 | 35.5 | 10.1 High, 0.9 Low | 4580 | 163.5 |
| 288-3 | do | 55/20/25 | 20¼ Hrs | 29 | 23 | 17 | 34.8 | 5.2 High, 0.37 Low | 4720 | 67.3 |
| 273-5 | Isop. But. A. N | 60/10/25 | 17¾ Hrs | 35 | 11.3 | 10 | 21.6 | 0.12 | 670 | 5.3 |
| 278-3 | do | 40/35/25 | 17½ Hrs | 35 | | | 22.9 | Cheeselike | No bubble | |
| Natural Rubber | | | | | 15.5 | 12 | 12.1 | 8.0 | 1510 | 659.0 |

[1] In the list of reactants, But. is butadiene, Isop. is isoprene, A. N. is acrylonitrile, M. A. N. is methacrylonitrile and Sty. is styrene.
[2] Sample Nos. H-3-8 and 206-8 were prepared with $H_2O_2$ catalyst.

The results in Table I show that the wet gel strength or wet film strength is not just a single property of the polymer but possibly three properties. The first, manifest in the so-called yield pressure, is undoubtedly an indication of the toughness of the gel, its rigidity or its ability to resist deformation and probably has little bearing on the actual film strength of the gel. A second property determined by the bursting pressure is related to the actual strength of the film. A third property characterized by the bubble volume is an indication of the extensibility or elongation of the wet film. All of these properties are important in latex applications.

The data given in the table shows the following:

(1) Emulsion copolymers containing mainly butadiene as the copolymerizing diolefin have little if any wet film or wet gel strength when prepared in the normal manner. On the application of air pressure during the test these gels just crack and no balloon is formed.

(2) An improvement in the film strength and elongation (extensibility) of copolymers containing butadiene as one of the coreactants can be improved greatly by conducting the polymerization at low temperatures (10–15° C.) in the presence of hydrogen peroxide as catalyst.

(3) Major improvements in extensibility and film strength are produced by substituting isoprene for butadiene as the copolymerizing diolefin at least to the extent of 80–85% of the total diolefin present.

(4) The wet film properties are improved by increasing the percent coreactant (acrylonitrile, styrene, etc.) in the polymerization mixture. For best results, the polymer should contain at least 30% of such a coreactant and preferably 40–55%.

(5) An improvement in the film strength can also be brought about through the use of three component polymers of isoprene, styrene, acrylonitrile, etc. containing isoprene as the major single component (at least 50% of the total reactants).

EXAMPLE 2

In order to compare the emulsion copolymerizates of butadiene and styrene prepared under conditions conducive to the formation of a product suitable for use as dry rubber with a similar copolymer prepared in accordance with the present invention, two runs were carried out in accordance with the following recipes:

A

| | | |
|---|---|---|
| $H_2O$ | ml | 4500 |
| Ivory Flakes | gms | 115 |
| Styrene | gms | 625 |
| Butadiene | gms | 1875 |
| Lorol mercaptan | gms | 15 |
| $K_2S_2O_8$ | gms | 7.5 |
| Temp. | °C | 50 |
| Time | hrs | 10 |
| Conversion (based on monomers converted) | per cent | 72 |
| Intrinsic viscosity of polymer dissolved in benzene | | 1.617 |
| Viscosity average mol. wt | | 410,000 |

B

| | | |
|---|---|---|
| $H_2O$ | ml | 4500 |
| Ivory Flakes | gms | 115 |
| 30% $H_2O_2$ | ml | 50 |
| Ferric sulfate | gms | 0.9 |
| Cobalt chloride | gms | 0.04 |
| Sodium pyrophosphate | gms | 12.5 |
| Styrene | gms | 625 |
| Butadiene | gms | 1875 |
| Temp. | °C | 12–15 |
| Time | hrs | 170 |
| Polymer conversion | per cent | 60 |
| Intrinsic viscosity of the polymer dissolved in benzene | | 2.344 |
| Viscosity average mol. wt | | 720,000 |

The coagulate of the copolymer produced in accordance with recipe A was crumbly and almost without strength, literally falling apart in the hands. This coagulate could be worked on a rubber mill, broken down and compounded with carbon black and other compounding ingredients to form a satisfactory tire tread stock.

The coagulate of the copolymer produced in accordance with recipe B, however, was very strong and could be stretched between the hands to give tough, thin, transparent films which could be broken only with difficulty. This coagulate was so tough and non-plastic that it could not be worked up easily on a rubber mill with compounding ingredients and therefore was of lesser value for dry rubber purposes requiring compounding of the polymer with reinforcing or filling agents as well as plasticizers, vulcanizing agents and the like. It was well suited for easy handling in latex spreading, dipping, gelation, etc. operations.

EXAMPLE 3

A sample of a butadiene-acrylonitrile copolymer latex was prepared according to the following recipe:

```
H2O ----------------------------- c. c.- 400
Oleic acid ----------------------- g.-   9.2
KOH (0.868 N) ------------------- c. c.-  25
Potassium persulfate ------------- g.-   0.6
Acrylonitrile -------------------- g.-    52
Lorol mercaptan ------------------ g.-     1
Butadiene ------------------------ g.-   148
```

The polymerization was carried out at 10° C. for 9 days. The conversion obtained was 81.5%. This latex yielded coagulates which were very strong and could be stretched between the hands to give tough, thin, transparent films which could be broken only with difficulty.

It may readily be seen from the foregoing examples that we have prepared synthetic rubber latices from diolefin hydrocarbons having high wet gel strength and which are suitable for use in ordinary latex operations as readily as natural rubber latex. The foregoing description contains a limited number of embodiments of the present invention but we do not intend to be limited to the specific conditions described therein since numerous variations are possible without departing from the scope of the following claim.

What we claim and desire to secure by Letters Patent is:

In the process of molding synthetic rubber latex the improvement which comprises coagulating with sodium silico fluoride a latex prepared by polymerizing a mixture of 60% isoprene and 40% acrylonitrile in aqueous emulsion in the presence of a potassium persulfate catalyst and a mercaptan modifier at temperatures about 29% C.

MILLER W. SWANEY.
ERVING ARUNDALE.

REFERENCES CITED

The following references are of record in the file of this patent:

UNITED STATES PATENTS

| Number | Name | Date |
| --- | --- | --- |
| 1,938,730 | Tschunkur | Dec. 12, 1933 |
| 1,973,000 | Konrad | Sept. 11, 1934 |
| 2,344,843 | Wellman | Mar. 21, 1944 |
| 2,357,861 | Willson | Sept. 12, 1944 |
| 2,366,325 | Fryling | Jan. 2, 1945 |
| 2,378,695 | Fryling | June 19, 1945 |
| 2,393,261 | Peaker | Jan. 22, 1946 |
| 2,444,801 | Arundale | July 6, 1948 |

FOREIGN PATENTS

| Number | Country | Date |
| --- | --- | --- |
| 364,089 | Great Britain | Dec. 2, 1931 |
| 472,912 | Great Britain | Oct. 1, 1937 |
| 527,219 | Great Britain | Oct. 4, 1940 |

OTHER REFERENCES

"Neoprene Latex" Report 39-3, page 13, Du Pont May 1939.

Mueller: India Rubber World (Oct. 1942), pp. 33-35 and 41.

Lomakin: Colloid J (USSR) 2:281-91 (1936), as abstracted in 30 CA 6602 (1936).